US012587090B2

(12) United States Patent
Bucher, II

(10) Patent No.: US 12,587,090 B2
(45) Date of Patent: Mar. 24, 2026

(54) LOW LOSS SNUBBER WITH ENERGY RECOVERY

(71) Applicant: Cummins Inc., Columbus, IN (US)

(72) Inventor: James Douglas Bucher, II, Rogers, MN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/788,262

(22) Filed: Jul. 30, 2024

(65) Prior Publication Data

US 2026/0039190 A1 Feb. 5, 2026

(51) Int. Cl.
H02M 1/34 (2007.01)
H02M 3/335 (2006.01)

(52) U.S. Cl.
CPC ....... H02M 1/346 (2021.05); H02M 3/33576 (2013.01); B60L 2210/10 (2013.01); Y02B 70/10 (2013.01)

(58) Field of Classification Search
CPC ........ Y02B 70/10; H02M 1/346; H02M 1/34; H02M 1/348; H02M 1/344; H02M 1/342; H02M 3/22; H02M 3/24; H02M 3/335; H02M 3/33576; H02M 3/33592; H02M 3/33573
See application file for complete search history.

(56) References Cited

U.S. PATENT DOCUMENTS 8,787,044 B2 7/2014 Yang et al.
9,318,968 B2 4/2016 Lehn 10,097,081 B1 10/2018 Bucher, II et al.
10,892,678 B2 1/2021 Escudero Rodriguez et al.
2003/0147264 A1 8/2003 Jinno
2010/0315839 A1* 12/2010 Yang ................. H02M 3/33576
363/17
2014/0362613 A1 12/2014 Park et al.
2018/0334043 A1* 11/2018 Zou ......................... H02M 1/08
2022/0376612 A1 11/2022 Lopez Rodriguez et al.
2022/0399804 A1* 12/2022 Rehlaender ....... H02M 3/33538

FOREIGN PATENT DOCUMENTS

DE 102005018011 10/2006
EP 410706 12/2022
WO 0054399 9/2000

* cited by examiner

*Primary Examiner* — Ryan Johnson
(74) *Attorney, Agent, or Firm* — Taft, Stettinius & Hollister LLP

(57) ABSTRACT

A vehicle system includes a powertrain system including one or more electrical loads and prime mover configured to drive one or mechanical loads. A power converter is configured to power the one or more electrical loads via a main output and an auxiliary output The power converter includes a rectifier configured to power the main output and including a plurality of switching devices, an inductive-capacitive network operatively coupled with the plurality of switching devices and configured recover energy of electrical transients result resulting from operation of the plurality of switching devices, and a capacitive reservoir configured to store energy recovered by the inductive-capacitive network and power a DC/DC converter with said energy, the DC/DC converter being operatively coupled with the auxiliary output.

20 Claims, 7 Drawing Sheets

LOW LOSS SNUBBER WITH ENERGY RECOVERY

TECHNICAL FIELD

The present application relates to low loss snubbers with energy recovery and related apparatuses, systems, and processes.

BACKGROUND

Power electronics switching devices can create transients such as voltage and current spikes when turning on and off. Existing approaches to mitigating such transients suffer from a number of disadvantages, shortcomings, and unmet needs including those respecting, complexity, efficacy, efficiency, electromagnetic interference (EMI), power losses, and thermal management, among others. There remains a significant need for the unique apparatuses, processes, and systems disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

Some embodiments include apparatuses including unique low loss snubbers with energy recovery. Some embodiments include unique processes involving unique low loss snubbers with energy recovery. Some embodiments include unique systems including low loss snubbers with energy recovery. Further embodiments, forms, objects, features, advantages, aspects, and benefits shall become apparent from the following description and drawings.

DETAILED DESCRIPTION OF EXAMPLE EMBODIMENTS

Figure 1:
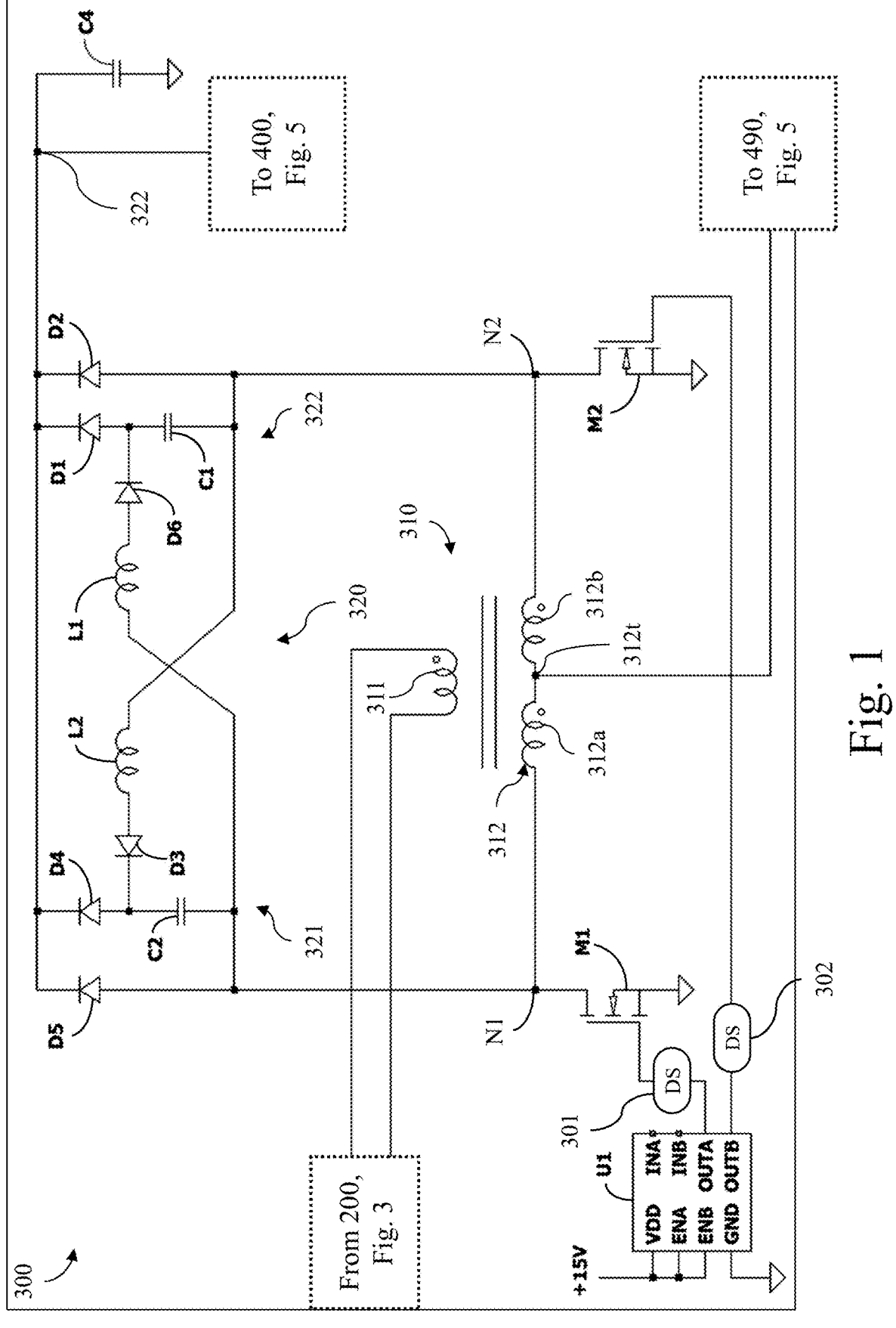
FIG. 1 is a schematic diagram depicting certain aspects of an example vehicle system.

With reference to FIG. 1, there is illustrated an example system 100 including a powertrain system 110 (also referred to herein as system 110) including a prime mover system 111 configured to drive one or more loads 109. System 100 may be configured and provided in a number of forms. In the illustrated embodiment, system 100 is configured and provide in the form of a vehicle system, for example, an on-highway vehicle or an off-highway vehicle system. In other embodiments, system 100 may be configured and provided in the form of a work machine or work machine powertrain system, a genset or genset powertrain system, or a hydraulic fracturing rig or hydraulic fracturing rig powertrain system, to name several non-limiting examples. In shall be appreciated that system 100 may include a number of other components as will occur to one of skill in the art with the benefit and insight of the present disclosure. While system 100 is illustrated and described in the context of a powertrain system, it shall be appreciated that the present disclosure contemplates used in a variety of other systems including a power supply with a center-tapped output.

System 110 and prime mover system 111 may be configured and provided in a number of forms. In the illustrated example, system 110 and prime mover system 111 are configured and provided in a hybrid combustion-electric form including an internal combustion engine 114 and associated intake air handling system 112, exhaust system 116, and fueling system 158, and also including motor/generator (M/G) 115 and associated battery system 119 and power electronics 134. In other example embodiments, system 110 and prime mover system may be configured and provided as another type of prime mover system such as, for example, powertrains comprising battery electric prime mover systems, powertrains comprising fuel cell prime mover system, or other forms of powertrain and prime mover system as will occur to one of skill in the art with the benefit and insight of the present disclosure. In some such embodiments, internal combustion engine 114 and associated intake air handling system 112, exhaust system 116, and fueling system 158 may be omitted and the prime mover system pay be configured and provided in a battery electric form. It shall also be appreciated that system 110 may include a number of other components which are not depicted herein such as transmission systems and components, engine accessories, and other systems and components as will occur to one of skill in the art with the benefit and insight of the present disclosure.

In the illustrated embodiment, engine 114 is configured and provided in a four-stroke, compression ignition form. It shall be appreciated that engine 114 may be provided in a number of forms including spark ignition and liquid-spark ignition forms. Furthermore, in various forms, engine 114 may be configured for combustion of a number of fuels including, for example, diesel fuel, gasoline, natural gas, other gaseous hydrocarbons, hydrogen, alcohols, or other fuels or combinations of fuels as will occur to one of skill in the art with the benefit and insight of the present disclosure. Typical forms of engine 114 may include a block including a plurality of cylinders and a head coupled with the block. The head typically includes intake ports, intake valves configured to selectively open and close the intake ports, exhaust ports, exhaust valves configured to selectively open and close the exhaust ports, injector bores, fuel injectors disposed in the injector bores, spark plug bores, and spark plugs disposed in the spark plug bores. A plurality of pistons may be provided in respective ones of the plurality of cylinders. A crankshaft may be coupled with the plurality of pistons and configured to translate reciprocating motion of the plurality of pistons to provide torque for driving loads 109 which may include internal loads of system 110 (such oil pumps, valvetrains, fuel pumps and other loads of engine 114, and accessory loads of system 110). It shall be appreciated that system 110 may include a number of other components as will occur to one of skill in the art with the benefit and insight of the present disclosure.

Intake air handling system 112 may include one or more air handling conduits, air filters, compressors (such as a compressor of a turbocharger or supercharger), coolers (such as charger air coolers, intercoolers, and/or aftercoolers which may be, for example, of an air-to-air type or an air-to-liquid type), and sensors (such as temperature sensors, pressure sensors, mass flow sensors, and other types of sensors), as well as other components.

Exhaust system 116 may include one or more exhaust handling conduits, turbines (such as a turbine of a turbocharger), aftertreatment components (such as oxidation catalysts, particular filters, selective catalytic reduction (SCR) catalysts, and/or other catalysts and aftertreatment components), and sensors (such as temperature sensors, pressure sensors, oxygen or lambda sensors, mass flow sensors, and other types of sensors), as well as other components.

Fueling system 158 may be configured and provided as a high-pressure common-rail fuel injection system including a plurality of fuel injectors in fluid communication with a common fuel rail, which supplies fuel at relatively high pressure to the plurality of fuel injectors. Fuel may be supplied to the common fuel rail by a high-pressure pump which, in turn, may be fed by a relatively low-pressure fuel circuit including a booster pump, which may be immersed in a tank containing a reservoir of fuel.

In the illustrated embodiment, system 110 and prime mover system 111 are configured and provided in a parallel hybrid form in which motor/generator 115 can operate as a motor a powered by electricity from battery system 119 via power electronics 134 to output torque to drive loads either alone or in combination with torque output by engine 114, or as an electric generator driven by torque from engine 114 or regenerative braking, to generate and provide power via power electronics 134 to charge battery system 119.

In the illustrated embodiment, battery system 119 is configured and operable to output power via power electronics 134 to selectively power and drive either or both of motor/generator 115 and auxiliary electrical loads 117. Auxiliary electrical loads 117 may comprise any or a number of electrified vehicle loads including, for example, electrified fans, pumps, compressors, or other loads as will occur to one of skill in the art with the benefit and insight of the present disclosure.

System 110 includes an electronic control system (ECS) 130 which preferably includes one or more programmable microcontrollers of a solid-state, integrated circuit type, and one or more non-transitory memory media configured to store instructions executable by the one or more microcontrollers. For purposes of the present application the term microcontroller shall be understood to also encompass microprocessors and other types of integrated circuit processors. ECS 130 is in operative communication with and may be adapted and configured to control operation of and/or receive inputs from sensors or controllers of intake air handling system 112, engine 114, exhaust system 116, and fueling system 158. ECS 130 is in operative communication with and may be adapted and configured to control operation of and/or receive inputs from one or more system sensors 102 of system 100 which may include, for example, a throttle position sensor or an accelerator position sensor. It shall be appreciated that FIG. 1 depicts control relationships between the foregoing components conceptually using dashed arrows and that various communications hardware and protocols may be utilized to implement, such as one or more controller area networks (CAN) or other communications components.

ECS 130 can be implemented in any of a number of ways that combine or distribute the control function across one or more control units in various manners. The ECS 130 may execute operating logic that defines various control, management, and/or regulation functions. This operating logic may be in the form of dedicated hardware, such as a hardwired state machine, analog calculating machine, programming instructions, and/or a different form as would occur to those skilled in the art. The ECS 130 may be provided as a single component or a collection of operatively coupled components; and may be comprised of digital circuitry, analog circuitry, or a hybrid combination of both of these types. When of a multi-component form, the ECS 130 may have one or more components remotely located relative to the others in a distributed arrangement. The ECS 130 can include multiple processing units arranged to operate independently, in a pipeline processing arrangement, in a parallel processing arrangement, or the like. It shall be further appreciated that the ECS 130 and/or any of its constituent components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or components as would occur to those skilled in the art to perform the desired communications.

An operating environment 99 is also depicted in FIG. 1. As described above, during typical operation of system 100, ambient air 91 of operating environment 99 is received as an input to system 100, and treated exhaust 93 from system 100 is released to operating environment 99. In some embodiments, loads 109 may at least in part comprise a portion of operating environment 99. For example, in embodiments where system 100 is provided in the form of a genset or genset powertrain system, the one or more loads 109 may comprise loads at various nodes in a distributed power network in addition to load components which, even if small, are integral to system 100. As another example, in embodiments where system 100 is provided in the form of a vehicle or vehicle powertrain system, loads 109 may include forces such as wind, gravity, road surface friction and other environmental load components in addition to load components which, even if small, are integral to system 100.

Figure 2:
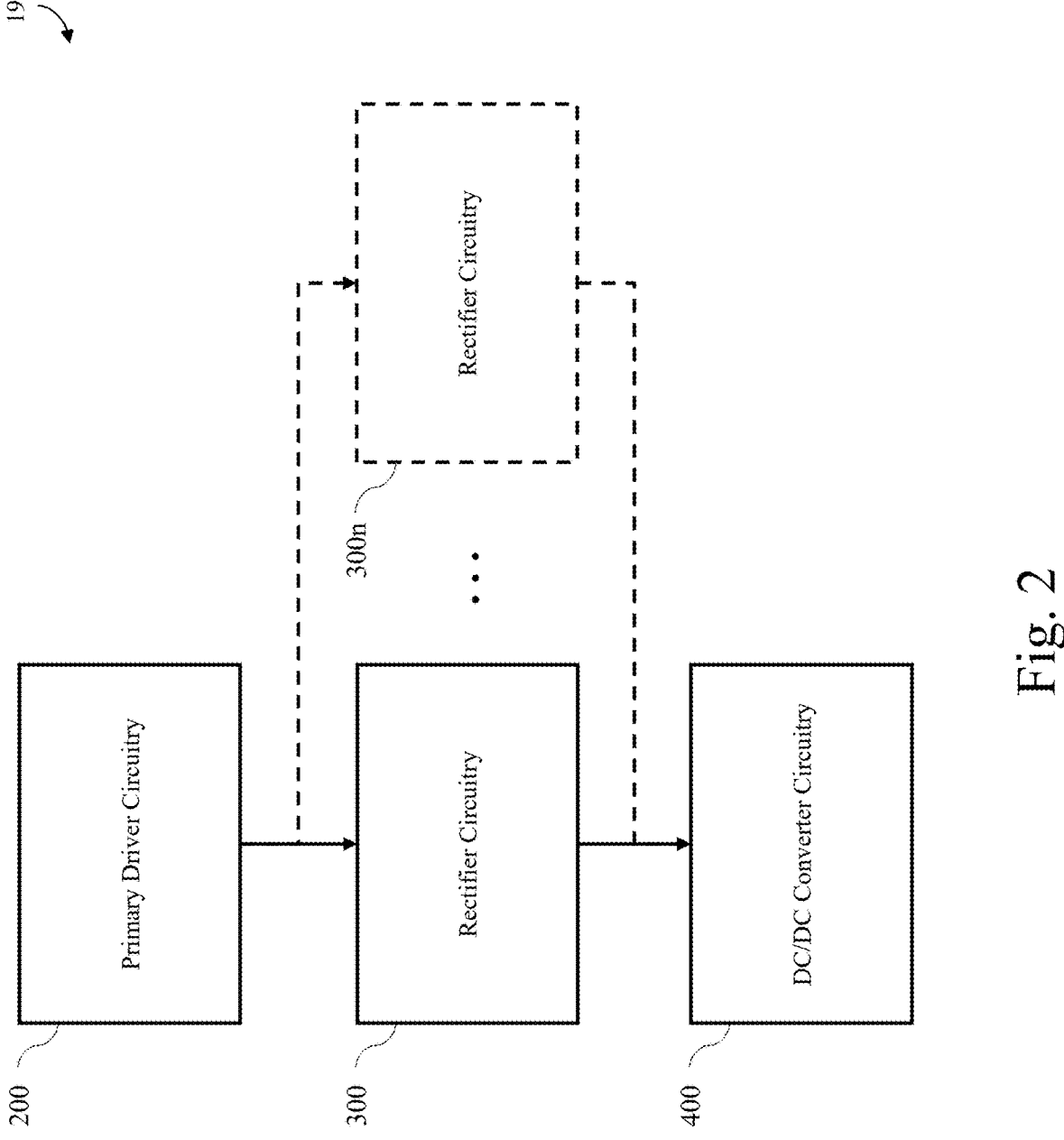
FIG. 2 is a schematic diagram depicting certain aspects of example power electronics circuitry.

With reference to FIG. 2 there is illustrated an example power electronics implementation 199 of certain aspects of power electronics 134. It shall be appreciated that power electronics 134 may include additional or alternative aspects from those illustrated in example power electronics implementation 199. It shall likewise be appreciated that power electronics implementation 199 may be provided in additional or alternative power electronics and related systems other that power electronics 134.

In the illustrated example, power electronics implementation 199 includes primary winding driver circuitry 200 (also referred to herein as circuitry 200), rectifier circuitry 300 (also referred to herein as circuitry 300), and DC/DC converter circuitry 400 (also referred to herein as circuitry 400). In some forms, power electronics implementation 199 may include one or more additional instances of rectifier circuitry 300n which may be configured and provided in the same or a similar form as rectifier circuitry 300. In various embodiments, any number of one or more instances of rectifier circuitry can be provided in the illustrated relationship with primary winding driver circuitry 200 and DC/DC converter circuitry 400.

Figure 3:
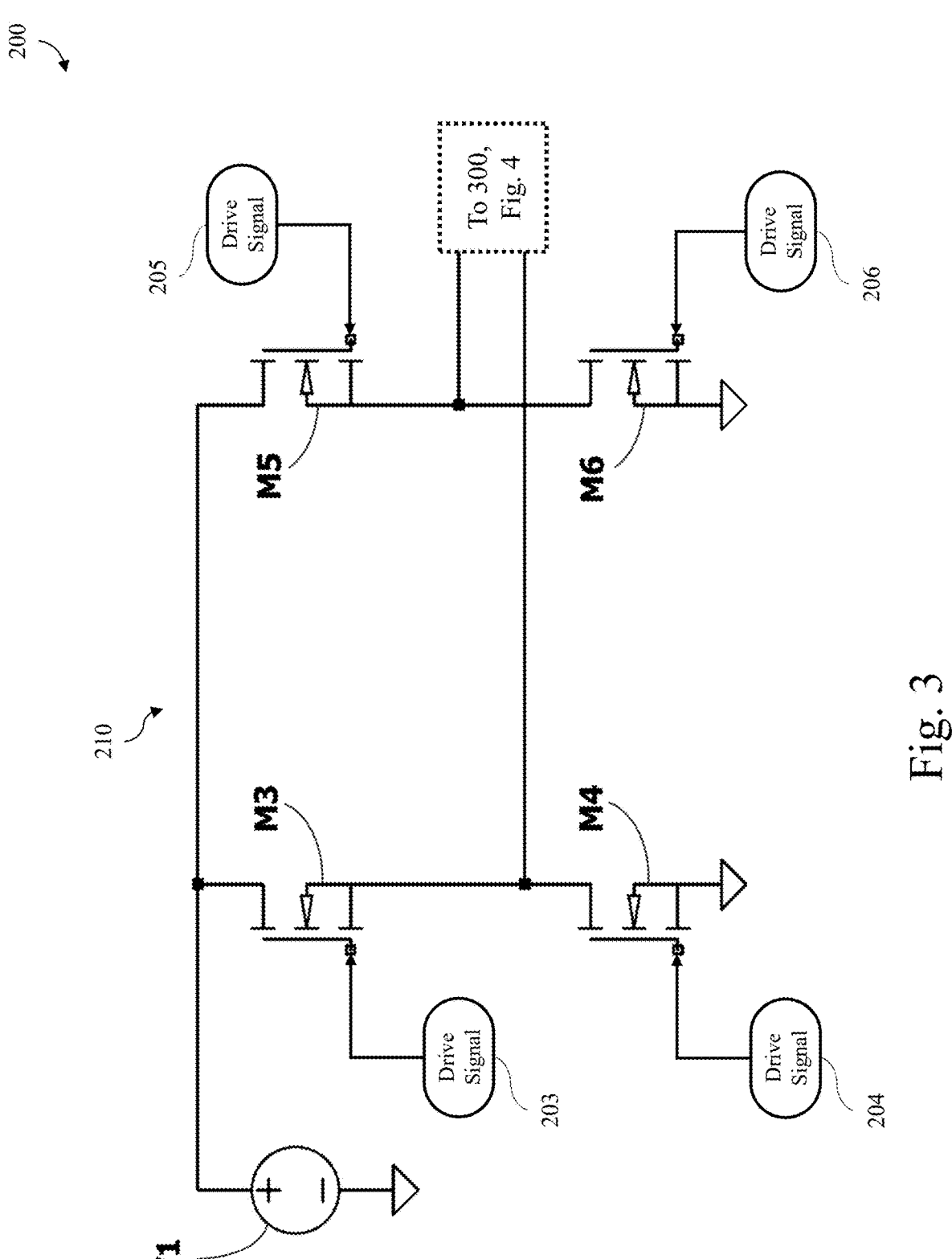
FIG. 3 is a schematic diagram depicting certain aspects of an example implementation of the example primary driver circuitry of FIG. 2.

With reference to FIG. 3, there is illustrated an example implementation of circuitry 200. In the illustrated example, circuitry 200 comprises an H-bridge inverter 210 including switching device M3 (also referred to as switch M3), switching device M4 (also referred to as switch M4), switching device M5 (also referred to as switch M5), and switching device M6 (also referred to as switch M6) (collectively, switching devices M3-M6 or switches M3-M6) which are configured to selectably open and close respectively in response to drive signal 203, drive signal 204, drive signal 205, and drive signal 206, (collectively, drive signals 203-206). In the illustrated example, switching devices M3-M6 are configured and provided as power MOSFETs and drive signals 203-206 are configured and provided as gate drive signals. Other embodiments may utilize other types of switching devices and corresponding drive signals such as, for example, JFETs, IGBTs, SiC devices, and other switching devices as will occur to one of skill in the art with the benefit and insight of the present disclosure.

During operation of H-bridge inverter 210, switching devices M3-M6 are controlled in response to drive signals 203-206 to invert DC voltage source VI and to output an inverted waveform to circuitry 300 as further described in connection with FIG. 4. It shall be appreciated that circuitry 200 may be configured and provide with other types of inverters and inverter topologies as will occur to one of skill in the art with the benefit and insight of the present disclosure.

Figure 4:
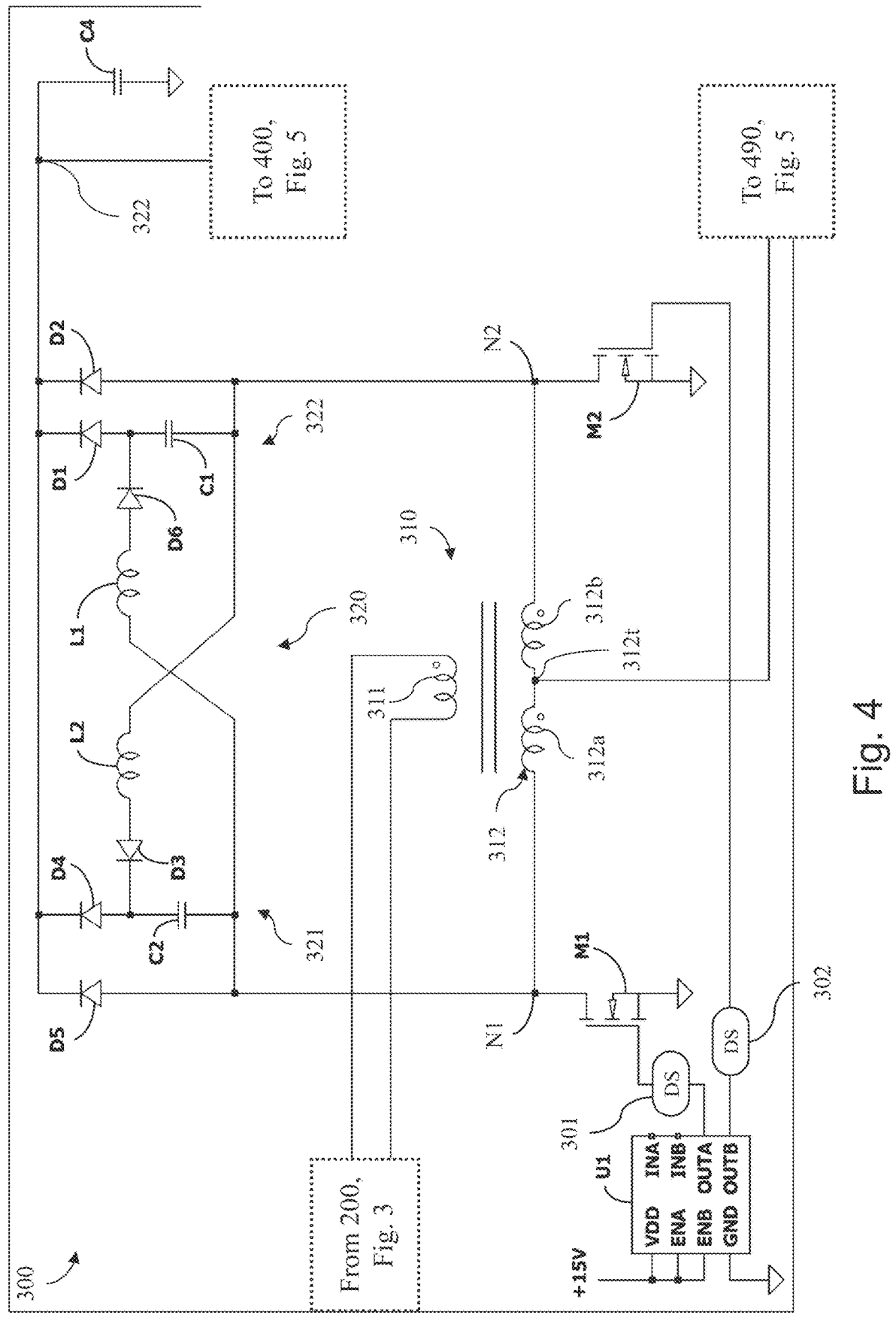
FIG. 4 is a schematic diagram depicting certain aspects of an example implementation of the example rectifier circuitry of FIG. 2.

With reference to FIG. 4, there is illustrated an example implementation of circuitry 300. In the illustrated example, circuitry 300 includes a transformer 310 including a primary winding 311 which is operatively coupled with and configured to receive output of H-bridge inverter 210 of circuitry 200. Transformer 310 includes a center tapped secondary winding 312 including a first winding portion 312a, a second winding portion 312b, and a center tap output 312t. Center tap output 312t is configured and provided as main output of circuitry and is configured to provide rectified power to vehicle system loads 501 as illustrated in FIG. 5

A switching device M1 is operatively coupled with first winding portion 312a at node N1, and a switching device M2 is operatively coupled with second winding portion 312b at node N2. Integrated circuit (IC) U1 is operatively coupled with configured to respectively provide drive signal 301 and drive signal to control operation of switching device M1 and switching device M2. In the illustrated example, switching device M1 and switching device M2 are configured and provided as power MOSFETs and drive signal 301 and drive signal 302 are configured and provided as gate drive signals. Other embodiments may utilize other types of switching devices and corresponding drive signals such as, for example, JFETs, IGBTs, SiC devices, and other switching devices as will occur to one of skill in the art with the benefit and insight of the present disclosure. It shall be appreciated that the illustrated topology of switching device M1 and switching device M2 is but one example of a suitable switching topology which may be utilized in connection with transformer 310 and that additional switching devices and/or alternative switching devices and topologies may be utilized in other embodiments as will occur to one of skill in the art with the benefit and insight of the present disclosure.

Figure 5:
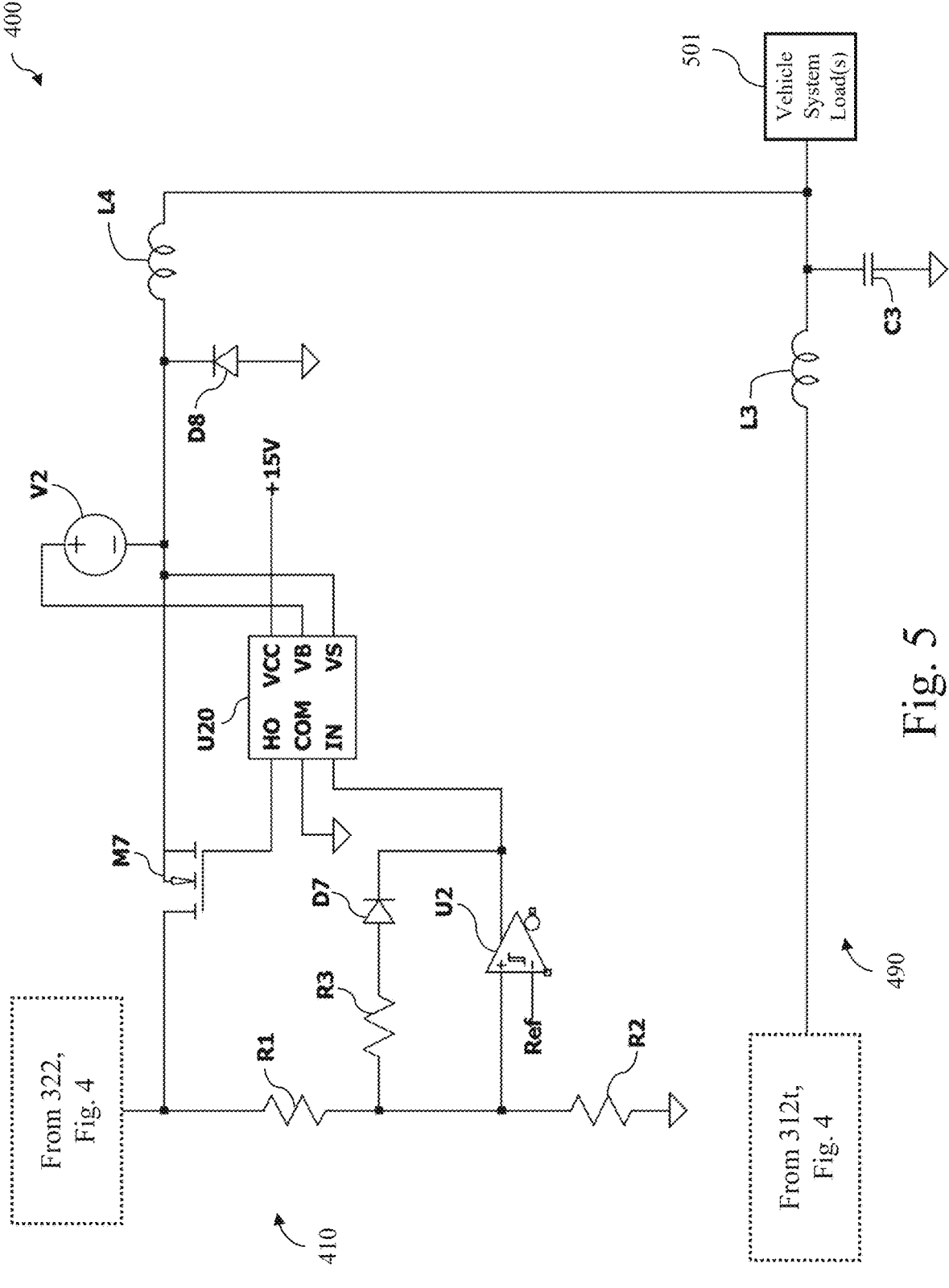
FIG. 5 is a schematic diagram depicting certain aspects of an example implementation of the example DC/DC converter circuitry of FIG. 2.

Switching device M1 and switching device M2 are configured and operable in combination with transformer 310 to rectify inverted power received form circuitry 200 and provide the rectified power at center tap output 312t as a main power output to vehicle system loads 501 as illustrated in FIG. 5

During operation, switching device M1 and a switching device M2 may generate electrical transients. For example, the opening (i.e., turning off) of switching device M1 and switching device M2 may cause voltage spikes at the drain outputs which are operatively coupled with first winding portion 312a and second winding portion 312b, respectively. The drain outputs of switching device M1 and switching device M2 are also operatively coupled with inductive-capacitive network 320 which is configured and operable to recover energy of electrical transients result resulting from operation of switching device M1 and switching device M2.

Inductive-capacitive network 320 includes a first energy recovery branch 321 which is configured and operable to recovery energy of electrical transients resulting from operation of switching device M1. Such electrical transients may comprise, for example, rectifier waveform spikes (e.g., voltage spikes) resulting from opening of switch M1 and parasitic inductance and capacitance of transformer 310 and/or circuit 300.

First energy recovery branch 321 comprises an inductor L1 which is configured and operable to control a rate of increase of a first current waveform associated with the electrical transients resulting from operation of switching device M1. First energy recovery branch 321 further comprises and a capacitor C1 which is configured to store charge of the first voltage waveform of switch M1 and, when switch M2 opens, to discharge via diode D1 to capacitor C4 and to circuitry 400 illustrated if FIG. 5. Diode D6 allows current to flow from inductor L1 to charge capacitor C1, but blocks current flow in the reverse direction thereby forcing capacitor C1 to discharge to capacitor C4 and circuitry 400. Excess energy not used to charge capacitor C1 will flow through diode D5 when a voltage spike exceeds the voltage on capacitor C4.

Inductive-capacitive network 320 includes a second energy recovery branch 322 which is configured and operable to recovery energy of electrical transients resulting from operation of switching device M3. Such electrical transients may comprise, for example, rectifier waveform spikes (e.g., voltage spikes) resulting from opening (i.e., turning off) of switch M2 and parasitic inductance and capacitance of transformer 310 and/or circuit 300.

Second energy recovery branch 322 comprises an inductor L2 which is configured and operable to control a rate of increase of a second current waveform associated with the electrical transients resulting from operation of switching device M2. Second energy recovery branch 322 further comprises and a capacitor C2 which is configured to store charge of the slowed second current waveform and, when switch M1 opens, to discharge via diode D4 to capacitor C4 and to circuitry 400 illustrated in FIG. 5. Diode D3 allows current to flow from inductor L2 to charge capacitor C2, but blocks current flow in the reverse direction thereby forcing capacitor C2 to discharge to capacitor C4 and circuitry 400. Excess energy not used to charge capacitor C2 will flow through diode D2 when a voltage spike exceeds the voltage on capacitor C4.

Capacitor C4 is configured and provided as a relatively large capacitor and provides one example of a capacitive reservoir configured to discharge to power circuitry 400. Diode D1, diode D2, diode D4 and Diode D5 block current flow resulting from discharge of capacitor C4 forcing capacitor C4 to discharge to circuitry 400.

Circuitry 300 provides one example of low loss electrical transient snubber circuitry utilizing LC circuits to capture rectifier waveform spikes in a capacitive reservoir. More particularly, circuitry 300 provides one example of a cross connected snubber architecture of uses energy from the opposite phase of a center tapped output on a DC/DC converter to inductively charge a capacitor to the voltage at the snubber reservoir capacitor. On a rising edge of the rectifier voltage waveform, the snubber capacitor energy is transferred to the snubber reservoir capacitor. As further illustrated and described in connection with FIG. 5, circuitry 400 then converts the energy for summing the energy with the DC/DC converter LC output filter. The illustrated example topologies and other topologies according to the principles of the present disclosure may be utilized to increase rectifier efficiency and reduced electromagnetic interference (EMI)

With reference to FIG. 5, there is illustrated an example implementation of circuitry 400. Circuitry 400 is one example of circuitry configured to receive energy recovered by the inductive-capacitive network 320 and capacitor C4, perform power conversion using the received energy, and provide power to an auxiliary output. In the illustrated example, circuitry 400 comprises a converter 410 which is configured and provided in the form of a hysteretic DC/DC buck converter which is configured and operable to step down voltage from a higher input level (received from) capacitor C4 to a lower level. The output voltage level of converter 410 is determined by its PWM duty ratio or output current proportional to the main DC-DC output current. Inductor L4 is used to transfer energy. Other embodiments may utilize other converter topologies varying from the illustrated example, as will occur to one of skill in the art with the benefit and insight of the present disclosure.

Converter 410 includes switching device M7 (also referred to as switch M7) which is configured to control current flow through inductor L4 (permitting current flow when on and blocking current flow when off) Inductor L4 stores energy of this current flow when switching device M7 is on and releases the stored energy when switching device M7 is off thereby providing smoothing of output current. Switching device M7 is configured and provided as a power MOSFETs. Other embodiments may utilize other types of switching devices and corresponding drive signals such as, for example, JFETs, IGBTs, SiC devices, and other switching devices as will occur to one of skill in the art with the benefit and insight of the present disclosure.

Switching device M7 is operatively coupled with and controlled by integrated circuit (IC) U20 via its high side output HO. IC U20 further includes inputs for a power supply VCC, common ground reference COM, bootstrap voltage VB, input voltage sense IN, output voltage sense VS. IC U20 receives output of hysteretic comparator U2 at input voltage sense IN. Resistor R1, resistor R2, and resistor are configured and operable to set the operating points and biasing for the hysteretic comparator U2. Diode D7 and resistor R3 provide a reference hysteresis for hysteretic comparator U2. The duty cycle of the switching device M7 is controlled by high side output HO of IC U20 based on the feedback from the output voltage, to maintain stability of the output voltage despite variations in the input voltage or load conditions. IC U20 turns on the switching device M7 when the inductor voltage drops below a lower threshold (valley point) and turns it off when the voltage reaches an upper threshold (peak point). More particularly, the converter 410 is configured to operate below the synchronous rectifier 80% of voltage rating. The current will vary depending the input voltage and load, but the voltage will always be maintained between the upper and lower thresholds. This hysteresis ensures that the current through inductor L4 oscillates within a certain range, maintaining regulation. In the illustrated example, an isolated or bootstrapped voltage provides gate voltage greater than the source connected voltage to allow switch M7 (which is configured as an N-channel series switch) to turn on. In other embodiments, a P-channel switch can be used rendering the bootstrap voltage is unnecessary since the gate voltage is negative with respect to the source to turn on the switch.

As illustrated in FIG. 5, vehicle system loads 501 are powered by both and an auxiliary output path of converter 410, and a separate main output path 490 including inductor L4 which is operatively coupled with and configured to receive output from center tap output 312t of circuitry 300. It shall be appreciated that main output path 490 is distinct from the output of converter 410. Inductor L3 and capacitor C3 form a second order RLC low pass filter in combination with the resistance of vehicle system load(s) 501. Vehicle system load(s) 501 may comprise, for example, one or both of a traction battery and one or more auxiliary electrical loads which may comprise any or a number of electrified vehicle loads including, for example, electrified fans, pumps, compressors, or other loads as will occur to one of skill in the art with the benefit and insight of the present disclosure.

Figure 6:
FIG. 6 is a flow diagram depicting certain aspects of an example operating process of the example power electronics circuitry of FIG. 2.
Figure 6:
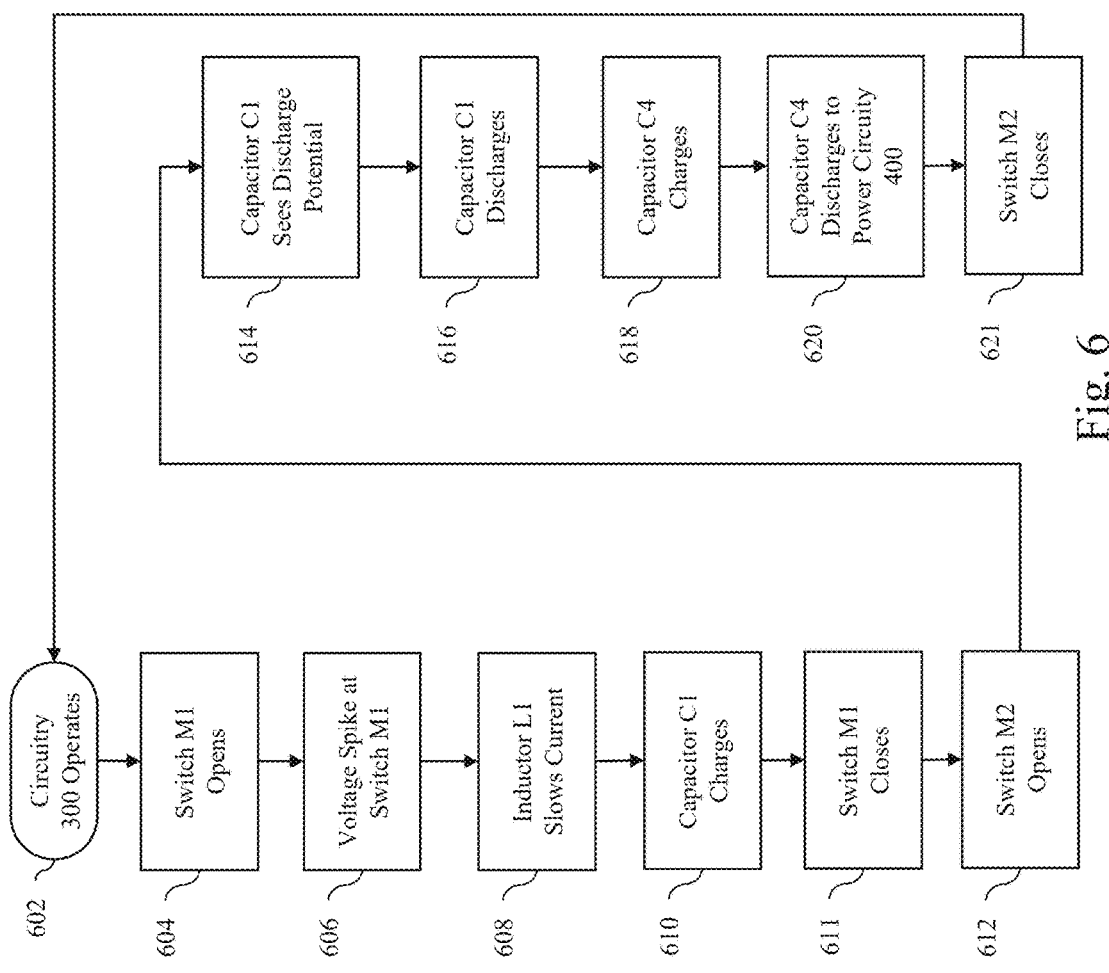
Figure 7:
FIG. 7 is a flow diagram depicting certain aspects of an example operating process of the example power electronics circuitry of FIG. 2.
Figure 7:
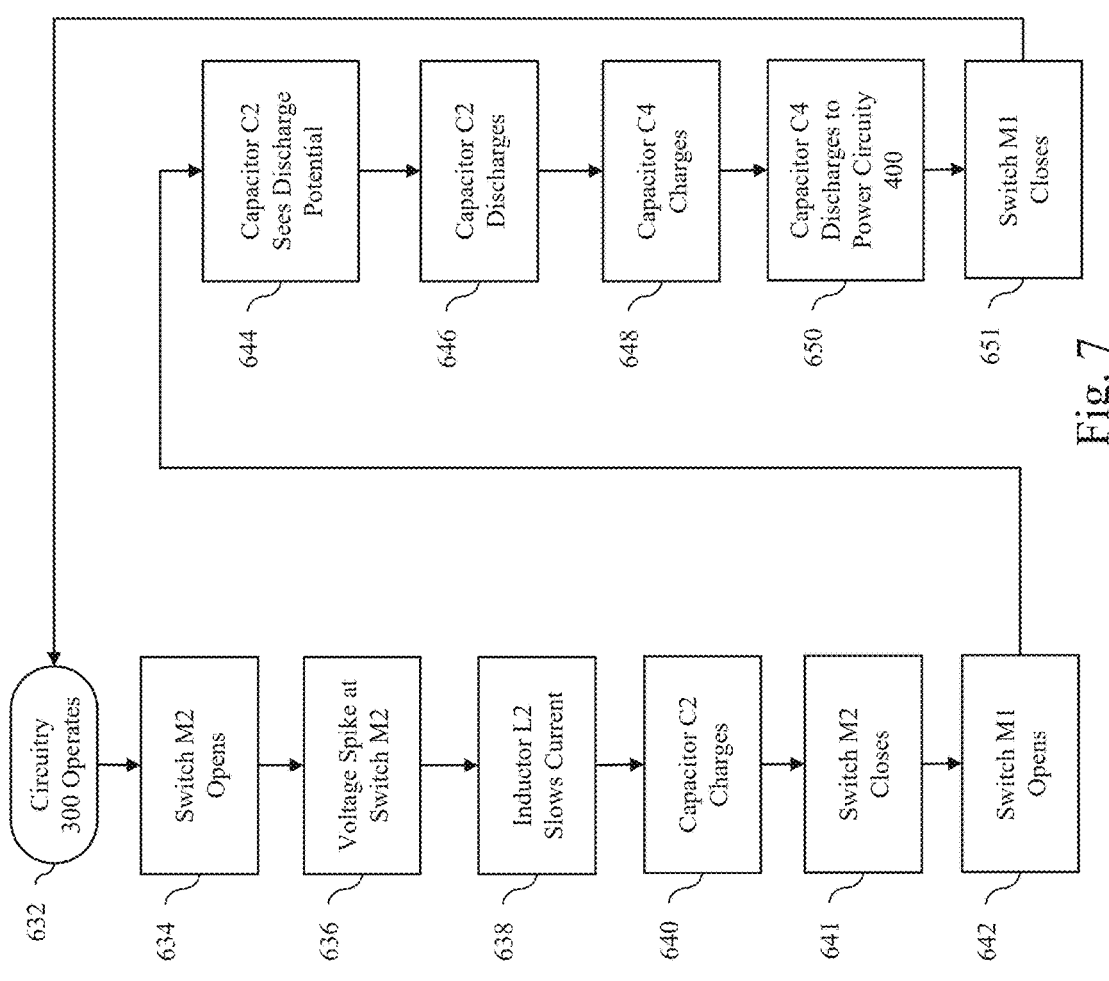

With reference to FIG. 6 and FIG. 7, there is illustrated an example process 600 which may be performed during operation of circuitry 300 or other circuitry according to the present disclosure. The aspects of process 600 illustrated in FIG. 6 relate in particular to operation of the first energy recovery branch 321 which may occur concurrently or in parallel with the operation of second energy recovery branch 322 as described in connection with FIG. 7.

Referring initially to FIG. 6, process 600 includes an operation 602 at which circuitry 300 is operating. From operation 602, process 600 proceeds to operation 604 at which switch M1 opens. From operation 604, process 600 proceeds to operation 606 at which an electrical transient (e.g., voltage spike) occurs at an output of switch M1. From operation 606, process 600 proceeds to operation 608 at which inductor L1 controls a rate of increase of a current associated with the transient occurring at the output of switch M1. From operation 608, process 600 proceeds to operation 610 at which capacitor C1 is charged by current from inductor L1.

From operation 610, process 600 proceeds to operation 611 at which switch M1 closes. From operation 611, process 600 proceeds to operation 612 at which switch M2 opens. The opening of switch M2 also creates an electrical transient the response to which is further described in connection with FIG. 7. From operation 612, process 600 proceeds to operation 614 at which capacitor C1 sees a discharge potential. From operation 614, process 600 proceeds to operation 616 at which capacitor C2 discharges to capacitor C4. From operation 616, process 600 proceeds to operation 618 at which capacitor C4 charges. From operation 618, process 600 proceeds to operation 620 at which capacitor C4 discharges to power circuitry 400. From operation 620, process 600 proceeds to operation 621 at which switch M2 closes. From operation 621, process 600 proceeds to operation 602.

The aspects of process 600 illustrated in FIG. 7 relate in particular to operation of the second energy recovery branch 322 which may occur concurrently or in parallel with the operation of first energy recovery branch 321 as described in connection with FIG. 6.

Referring now to FIG. 7, process 600 includes an operation 632 at which circuitry 300 is operating. From operation 632, process 600 proceeds to operation 634 at which switch M2 opens. While indicated with a separate reference numeral, this opening of switch M2 may be one and the same as the opening of switch M2 at operation 612.

From operation 634, process 600 proceeds to operation 636 at which an electrical transient (e.g., voltage spike) occurs at an output of switch M2. From operation 636, process 600 proceeds to operation 638 at which inductor L2 controls a rate of increase of a current associated with the transient occurring at the output of switch M2. From operation 638, process 600 proceeds to operation 640 at which capacitor C2 is charged by current from inductor L2.

From operation 640, process 600 proceeds to operation 641 at which switch M2 closes. While indicated with a separate reference numeral, this closing of switch M2 may be one and the same as the closing of switch M2 at operation 621.

From operation 640, process 600 proceeds to operation 642 at which switch M1 opens. While indicated with a separate reference numeral, this opening of switch M1 may be one and the same as the opening of switch M1 at operation 604. The opening of switch M1 also creates an electrical transient the response to which was described in connection with FIG. 6. From operation 642, process 600 proceeds to operation 644 at which capacitor C4 sees a discharge potential. From operation 644, process 600 proceeds to operation 646 at which capacitor C2 discharges to capacitor C4. From operation 646, process 600 proceeds to operation 648 at which capacitor C4 charges. From operation 648, process 600 proceeds to operation 650 at which capacitor C4 discharges to power circuitry 400.

From operation 650, process 600 proceeds to operation 651 at which switch M1 closes. While indicated with a separate reference numeral, this closing of switch M1 may be one and the same as the closing of switch M1 at operation 611. From operation 651, process 600 proceeds to operation 632.

As illustrated by this detailed description, the present disclosure contemplates multiple embodiments including the following example embodiments.

Example embodiment number 1 is a system comprising: a prime mover system configured to drive one or more mechanical loads; one or more electrical loads; and a power converter configured to power the one or more electrical loads via a main output and an auxiliary output, the power converter comprising: a rectifier configured to power the main output and including a plurality of switching devices, an inductive-capacitive network operatively coupled with the plurality of switching devices and configured recover energy of electrical transients result resulting from operation of the plurality of switching devices, and a DC/DC converter configured to receive energy recovered by the inductive-capacitive network and provide power to the auxiliary output.

Example embodiment number 2 includes the features of example embodiment number 1, wherein the rectifier comprises a transformer comprising a primary winding and a center tapped secondary winding, the center tapped secondary winding is operatively coupled with the main output, and the plurality of switching devices are operatively coupled with the center tapped secondary winding and operable with the center tapped secondary winding to power the main output.

Example embodiment number 2 includes the features of example embodiment number 1, wherein the inductive-capacitive network comprises: a first energy recovery branch configured to recovery energy of electrical transients resulting from opening of a first one of the plurality of switching devices, and a second energy recovery branch configured to recovery energy of electrical transients resulting from opening of a second one of the plurality of switching devices.

Example embodiment number 4 includes the features of example embodiment number 3, wherein the first energy recovery branch comprises a first inductor configured to control a rate of increase of a first current waveform associated with a first electrical transient resulting from operation of a first one of the plurality of switching devices, and a first capacitor configured to store charge of the current waveform and discharge to the DC/DC converter.

Example embodiment number 4 includes the features of example embodiment number 4, wherein the second energy recovery branch comprises a second inductor configured to control a rate of increase of a second current waveform associated with a second electrical transient resulting from operation of a first one of the plurality of switching devices, and a second capacitor configured to store charge of the second current waveform and discharge to the DC/DC converter.

Example embodiment number 6 includes the features of example embodiment number 1, wherein the inductive-capacitive network is configured to slow voltage rises occurring when the plurality of switching devices turn off.

Example embodiment number 7 includes the features of example embodiment number 2, wherein the one or more electrical loads comprise a traction battery system.

Example embodiment number 8 is an apparatus for powering one or more electrical loads of a powertrain system configured to drive a mechanical load, the apparatus comprising: power converter circuitry configured to power the one or more electrical loads via a main output and an auxiliary output, the power converter circuitry comprising: a rectifier configured to power the main output and including a plurality of switching devices, an inductive-capacitive network operatively coupled with the plurality of switching devices and configured recover energy of electrical transients result resulting from operation of the plurality of switching devices, and a DC/DC converter configured to receive energy recovered by the inductive-capacitive network and provide power to the auxiliary output.

Example embodiment number 9 includes the features of example embodiment number 8, wherein the rectifier comprises a transformer comprising a primary winding and a center tapped secondary winding, the center tapped secondary winding is operatively coupled with the main output, and the plurality of switching devices are operatively coupled with the center tapped secondary winding and operable with the center tapped secondary winding to power the main output.

Example embodiment number 10 includes the features of example embodiment number 8, wherein the inductive-capacitive network comprises: a first energy recovery branch configured to recovery energy of electrical transients resulting from opening of a first one of the plurality of switching devices, and a second energy recovery branch configured to recovery energy of electrical transients resulting from opening of a second one of the plurality of switching devices.

Example embodiment number 11 includes the features of example embodiment number 10, wherein the first energy recovery branch comprises a first inductor configured to control a rate of increase of a first current waveform associated with a first electrical transient resulting from operation of a first one of the plurality of switching devices, and a first capacitor configured to store charge of the first current waveform and discharge to the DC/DC converter.

Example embodiment number 12 includes the features of example embodiment number 11, wherein the second energy recovery branch comprises a second inductor configured to control a rate of increase of a second current waveform associated with a second electrical transient resulting from operation of a first one of the plurality of switching devices, and a second capacitor configured to store charge of the second current waveform and discharge to the DC/DC converter.

Example embodiment number 13 includes the features of example embodiment number 9, wherein inductive-capacitive network is configured to slow voltage rises occurring when the plurality of switching devices turn off.

Example embodiment number 14 includes the features of example embodiment number 9, comprising the powertrain system operatively coupled with the power converter.

Example embodiment number 15 is a process for powering one or more electrical loads of a powertrain system configured to drive a mechanical load, the process comprising: operating a power converter to power the one or more electrical loads via a main output and an auxiliary output, including: rectifying power with a rectifier configured to power the main output and including a plurality of switching devices, recovering energy of electrical transients result resulting from operation of the plurality of switching devices with an inductive-capacitive network operatively coupled with the plurality of switching devices, and receiving energy recovered by the inductive-capacitive network with a DC/DC converter configured and powering the auxiliary output with the DC/DC converter.

Example embodiment number 16 includes the features of example embodiment number 15, wherein the rectifying power comprises operating the plurality of switches in combination with a transformer comprising a primary winding and a center tapped secondary winding, the center tapped secondary winding being operatively coupled with the main output, the plurality of switching devices being operatively coupled with the center tapped secondary winding.

Example embodiment number 17 includes the features of example embodiment number 16, wherein the recovering energy comprises: first recovering energy with a first energy recovery branch configured to recovery energy of electrical transients resulting from opening of a first one of the plurality of switching devices, and second recovering a second energy recovery branch configured to recovery energy of electrical transients resulting from opening of a second one of the plurality of switching devices.

Example embodiment number 18 includes the features of example embodiment number 17, wherein the first recovering energy comprises controlling with a first inductor a rate of increase of a first current waveform associated with a first electrical transient resulting from operation of a first one of the plurality of switching devices, storing with a first capacitor charge of the first current waveform, and discharging the first capacitor to power the DC/DC converter.

Example embodiment number 19 includes the features of example embodiment number 18, wherein the second recovering energy comprises controlling with a second inductor a rate of increase of a second current waveform associated with a second electrical transient resulting from operation of a second one of the plurality of switching devices, storing with a second capacitor charge of the second current waveform, and discharging the second capacitor to power the DC/DC converter.

Example embodiment number 20 includes the features of example embodiment number 15, comprising powering one or both of a traction battery and an auxiliary electrical load of the powertrain system using power from the main output and power from the auxiliary output.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

It shall be appreciated that terms such as "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, SENT, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
a prime mover system configured to drive one or more mechanical loads;
one or more electrical loads; and
a power converter configured to power the one or more electrical loads via a main output and an auxiliary output, the power converter comprising:
a rectifier configured to power the main output and including a transformer including a primary winding and a secondary winding and a plurality of switching devices including a first switching device coupled with a first side of the secondary winding at a first node and a second switching device coupled with a second side of the secondary winding at a second node,
an inductive-capacitive network operatively coupled with the plurality of switching devices and configured recover energy of electrical transients result resulting from operation of the plurality of switching devices, and
a DC/DC converter configured to receive energy recovered by the inductive-capacitive network and provide power to the auxiliary output;
wherein the inductive-capacitive network comprises
a first energy recovery branch configured to recover energy of first electrical transients resulting from opening of the first switching device by charging a first capacitor with first current flow from the first node through a first inductor that controls a rate of increase of the first current, and discharging the first capacitor to the DC/DC converter, and
a second energy recovery branch configured to recover energy of electrical transients resulting from opening of the second switching device by charging a second capacitor with second current flow from the second node through a second inductor that controls a rate of increase of the second current, and discharging the second capacitor to the DC/DC converter.

2. The system of claim 1, wherein
wherein the secondary winding comprises a center tapped secondary winding operatively coupled with the main output.

3. The system of claim 1, wherein a first side of the first capacitor is coupled with the second one of the plurality of switching devices and a second side of the first capacitor is configured to receive the first current when charging, a first side of the second capacitor is coupled with the first one of the plurality of switching devices and a second side of the first capacitor is configured to receive the second current when charging.

4. The system of claim 1, comprising a first excess energy diode coupled between the first node and the DC/DC converter and configured to direct excess energy not used to charge the first capacitor to the DC/DC converter.

5. The system of claim 1, comprising a second excess energy diode coupled between the second node and the DC/DC converter and configured to direct excess energy not used to charge the second capacitor to the DC/DC converter.

6. The system of claim 1, wherein the inductive-capacitive network is configured to slow voltage rises occurring when the plurality of switching devices turn off.

7. The system of claim 2, wherein the one or more electrical loads comprise a traction battery system.

8. An apparatus for powering one or more electrical loads of a powertrain system configured to drive a mechanical load, the apparatus comprising:
power converter circuitry configured to power the one or more electrical loads via a main output and an auxiliary output, the power converter circuitry comprising:
a rectifier configured to power the main output and including a transformer including a primary winding and a secondary winding and a plurality of switching devices including a first switching device coupled with a first side of the secondary winding at a first node and a second switching device coupled with a second side of the secondary winding at a second node,
an inductive-capacitive network operatively coupled with the plurality of switching devices and configured recover energy of electrical transients result resulting from operation of the plurality of switching devices, and
a DC/DC converter configured to receive energy recovered by the inductive-capacitive network and provide power to the auxiliary output;
wherein the inductive-capacitive network comprises
a first energy recovery branch configured to recover energy of first electrical transients resulting from opening of the first switching device by charging a first capacitor with first current flow from the first node through a first inductor that controls a rate of increase of the first current, and discharging the first capacitor to the DC/DC converter, and
a second energy recovery branch configured to recover energy of electrical transients resulting from opening of the second switching device by charging a second capacitor with second current flow from the second node through a second inductor that controls a rate of increase of the second current, and discharging the second capacitor to the DC/DC converter.

9. The apparatus of claim 8, wherein the secondary winding comprises a center tapped secondary winding operatively coupled with the main output.

10. The apparatus of claim 8, wherein a first side of the first capacitor is coupled with the second one of the plurality of switching devices and a second side of the first capacitor is configured to receive the first current when charging, a first side of the second capacitor is coupled with the first one of the plurality of switching devices and a second side of the first capacitor is configured to receive the second current when charging.

11. The apparatus of claim 8, comprising a first excess energy diode coupled between the first node and the DC/DC converter and configured to direct excess energy not used to charge the first capacitor to the DC/DC converter.

12. The apparatus of claim 11, comprising a second excess energy diode coupled between the second node and the DC/DC converter and configured to direct excess energy not used to charge the second capacitor to the DC/DC converter.

13. The apparatus of claim 9, wherein inductive-capacitive network is configured to slow voltage rises occurring when the plurality of switching devices turn off.

14. The apparatus of claim 9, comprising the powertrain system operatively coupled with the power converter.

15. A process for powering one or more electrical loads of a powertrain system configured to drive a mechanical load, the process comprising:
operating a power converter to power the one or more electrical loads via a main output and an auxiliary output, including:

rectifying power with a rectifier configured to power the main output and including a transformer including a primary winding and a secondary winding and a plurality of switching devices including a first switching device coupled with a first side of the secondary winding at a first node and a second switching device coupled with a second side of the secondary winding at a second node, recovering energy of electrical transients result resulting from operation of the plurality of switching devices with an inductive-capacitive network operatively coupled with the plurality of switching devices, and receiving energy recovered by the inductive-capacitive network with a DC/DC converter configured and powering the auxiliary output with the DC/DC converter;

wherein the recovering energy of electrical transients result with the inductive-capacitive network comprises using a first energy recovery branch to recover energy of first electrical transients resulting from opening of the first switching device by charging a first capacitor with first current flow from the first node through a first inductor that controls a rate of increase of the first current, and discharging the first capacitor to the DC/DC converter, and using a second energy recovery branch to recover energy of electrical transients resulting from opening of the second switching device by charging a second capacitor with second current flow from the second node through a second inductor that controls a rate of increase of the second current, and discharging the second capacitor to the DC/DC converter.

16. The process of claim 15, wherein the secondary winding comprises a center tapped secondary winding operatively coupled with the main output.

17. The process of claim 16, wherein a first side of the first capacitor is coupled with the second one of the plurality of switching devices and a second side of the first capacitor is configured to receive the first current when charging, a first side of the second capacitor is coupled with the first one of the plurality of switching devices and a second side of the first capacitor is configured to receive the second current when charging.

18. The process of claim 15, comprising directing excess energy not used to charge the first capacitor to the DC/DC converter through a first excess energy diode coupled between the first node and the DC/DC converter.

19. The process of claim 15, comprising directing excess energy not used to charge the second capacitor to the DC/DC converter through a second excess energy diode coupled between the second node and the DC/DC converter.

20. The process of claim 15, comprising powering one or both of a traction battery and an auxiliary electrical load of the powertrain system using power from the main output and power from the auxiliary output.

* * * * *